US007342329B2

(12) United States Patent
Kaastra

(10) Patent No.: US 7,342,329 B2
(45) Date of Patent: Mar. 11, 2008

(54) POWER SUPPLY FOR ELECTRICAL DOMESTIC APPLIANCES AND DOMESTIC APPLIANCES FOR CO-ACTION WITH SUCH A POWER SUPPLY

(75) Inventor: Simon Kaastra, Dinxperlo (NL)

(73) Assignee: Ferro Techniek B.V. (NL)

( * ) Notice: Subject to any disclaimer, the term of this patent is extended or adjusted under 35 U.S.C. 154(b) by 281 days.

(21) Appl. No.: 10/312,421

(22) PCT Filed: Jun. 28, 2001

(86) PCT No.: PCT/NL01/00486

§ 371 (c)(1),
(2), (4) Date: Jul. 18, 2003

(87) PCT Pub. No.: WO02/01918

PCT Pub. Date: Jan. 3, 2002

(65) Prior Publication Data

US 2004/0012269 A1 Jan. 22, 2004

(30) Foreign Application Priority Data

Jun. 29, 2000 (NL) .................................... 1015566

(51) Int. Cl.
*H05B 1/02* (2006.01)
*H05B 3/68* (2006.01)
*H02H 3/38* (2006.01)

(52) U.S. Cl. ................. 307/126; 307/140; 219/448.11; 219/447.1; 219/497

(58) Field of Classification Search ................ 219/435, 219/459.1, 487, 448.11, 481, 447.1, 386, 219/387, 497; 361/93.8; 307/126, 140
See application file for complete search history.

(56) References Cited

U.S. PATENT DOCUMENTS

| | | | | | |
|---|---|---|---|---|---|
| 2,269,689 | A | * | 1/1942 | Reichold | 219/435 |
| 3,608,627 | A | * | 9/1971 | Shevlin | 165/206 |
| 3,715,550 | A | * | 2/1973 | Hamden et al. | 219/622 |
| 3,751,968 | A | * | 8/1973 | Loh et al. | 73/31.05 |
| 3,760,156 | A | * | 9/1973 | Kehl et al. | 219/448.17 |
| 4,016,429 | A | * | 4/1977 | Vercellotti et al. | 307/149 |

(Continued)

FOREIGN PATENT DOCUMENTS

GB 2 050 720 A 1/1981

(Continued)

*Primary Examiner*—Michael Sherry
*Assistant Examiner*—Andrew Deschere
(74) *Attorney, Agent, or Firm*—The Webb Law Firm

(57) ABSTRACT

The invention relates to a power supply for electrical domestic appliances, comprising: at least one connection to the mains electricity supply, and at least one connector for releasable electrical coupling of the power supply to a domestic appliance, wherein the power supply is also provided with measuring and control means for controlling a feed signal generated by the power supply by means of at least one control signal transmitted by a coupled domestic appliance. The invention also relates to a domestic appliance for co-action with such a power supply.

14 Claims, 2 Drawing Sheets

U.S. PATENT DOCUMENTS

| | | | | | |
|---|---|---|---|---|---|
| 4,092,520 | A | * | 5/1978 | Holmes et al. | 219/504 |
| 4,626,657 | A | * | 12/1986 | Endo et al. | 219/212 |
| 4,748,344 | A | | 5/1988 | Sing | |
| 4,763,015 | A | * | 8/1988 | St. Louis | 307/126 |
| 4,859,833 | A | * | 8/1989 | Petersen | 219/432 |
| 5,710,408 | A | * | 1/1998 | Jones | 219/481 |
| 5,724,244 | A | * | 3/1998 | Yabuki | 705/400 |
| 5,811,765 | A | * | 9/1998 | Nakagawa et al. | 219/497 |
| 6,124,574 | A | * | 9/2000 | Knepler | 219/447.1 |
| 6,198,079 | B1 | * | 3/2001 | Essig | 219/497 |
| 6,380,521 | B1 | * | 4/2002 | Fanzutti | 219/481 |
| 7,197,650 | B2 | * | 3/2007 | Watanabe et al. | 713/300 |

FOREIGN PATENT DOCUMENTS

| | | | |
|---|---|---|---|
| GB | 2 050 779 | A | 1/1981 |
| WO | WO 95 29572 | A | 11/1995 |

* cited by examiner

POWER SUPPLY FOR ELECTRICAL DOMESTIC APPLIANCES AND DOMESTIC APPLIANCES FOR CO-ACTION WITH SUCH A POWER SUPPLY

BACKGROUND OF THE INVENTION

1. Field of the Invention

The invention relates to a power supply for electrical domestic appliances, comprising: at least one connection to the mains electricity supply, and at least one connector for releasable electrical coupling of the power supply to a domestic appliance. The invention also relates to a domestic appliance for co-action with such a power supply, comprising an electrically driven element, such as for instance a heating element, cooling element or motor, and a mating connector for co-action with the connector of the power supply.

2. Description of the Prior Art

According to the prior art there already exist electric kettles for domestic use with a separate power supply which is generally embodied as a carrier base. An electrical connection between the kettle and the base is immediately established by placing the kettle on the base. For this purpose the kettle and base are respectively provided with one or more plugs and sockets When the kettle is removed from the carrier base the electrical coupling is broken once again. An on/off switch, a steam detector and the necessary provisions protecting overheating are generally integrated into the kettle. An advantage of this construction is that the kettle can be filled or emptied without the inconvenience of a connecting cable. The drawback of the existing carrier base with socket is that it can only be used with a specific kettle.

The British patent application GB 2 050 720 describes a device co-acting with a heating element for regulating passage of electrical current. The device comprises regulating means for regulating the amount of power to be fed to the heating element. The regulating means are provided with a magnet displaceable along a guide and a circuit of resistors of different sizes connected to each other in parallel. Depending on the desired set temperature a particular resistor is activated by the magnet, which results in a determined amount of power to be fed to the heating element. One or two mutually connected fuses are preferably incorporated in the device with an eye to safety of use.

U.S. Pat. No. 4,748,344 describes a portable device for supplying power. Described in particular is a device which comprises a belt and a plurality of mutually coupled batteries connected to the belt. The device is preferably also provided with an AC/DC converter. At least one of the batteries comprises a connector for releasable electrical coupling of the device to a (portable) appliance. In a preferred embodiment at least one of the batteries is provided with a plug, which plug is adapted for co-action with a socket connected to the mains electricity supply to enable recharging of the batteries.

The present invention has for its object to provide an improved power supply for electrical domestic appliances which can be employed to feed diverse appliances in an efficient manner.

SUMMARY OF THE INVENTION

The invention provides for this purpose a power supply of the type stated in the preamble, characterized in that the power supply is also provided with measuring and control means for controlling a feed signal generated by the power supply by means of at least one control signal transmitted by a coupled domestic appliance. The power supply according to the invention is an "intelligent" power supply which is adapted to drive a "non-intelligent" domestic appliance. A great advantage hereof is that diverse domestic appliances, which can be embodied in very simple manner, can be fed and actuated with a single, more complex power supply. In addition to the electrical element providing the desired functionality (heating element, cooling element, motor, pump etc.); it is not necessary to incorporate active electrical components in a domestic appliance. The domestic appliances can hereby take a form which is less effusive, less susceptible to malfunction, more compact and lighter than according to the prior art. A domestic appliance can be fed interactively by means of the power supply; the domestic appliance itself indicates what the characteristic of the feed signal should be by means of at least one control signal. The power supply is therefore able to automatically provide diverse power supply characteristics for diverse appliances and/or conditions.

In a preferred embodiment the power supply is characterized in that a control signal detectable by the measuring and control means consists of the power taken up by a domestic appliance. The advantage of this power supply is that no extra signal line is required to conduct a separate control signal from the domestic appliance to the power supply. This is because the control signal is contained in the power which is taken up by the domestic appliance and which is supplied by a normal feeder cable (having incorporated therein coupling means consisting of a connector and mating connector). Because an additional signal line is unnecessary, the construction of the power supply connector can therefore also remain relatively simple.

In another preferred embodiment the connector comprises an earth wire which is connected to the measuring and control means, and a control signal detectable by the measuring and control means consists of a signal transmitted by the earth wire from a domestic appliance to the power supply. Through the use of a normally mandatory earth wire for through-feed of one or more control signals, signals other the signals dependent on power take-off can be transmitted from the domestic appliance to the power supply without the necessity of a separate signal line which must be led through by means of the connector. In the case an earth wire is absent but a neutral wire is however present, this latter can be employed for signal through-feed as alternative to the earth wire.

When the power supply is provided with identification means for identifying a domestic appliance coupled to the power supply, a characteristic of the feed signal associated with the identified domestic appliance can immediately be automatically selected by the power supply. Examples of identification means are for instance base or mating connector patterns, transponders, specific signal converters etc. identifiable by the power supply. Identification of the domestic appliance (the passive part) can also take place by means of a capacitance measurement, for which purpose a capacitor is incorporated in the domestic appliance, the reactive current of which capacitor can be identified by measurement. Particularly when the measuring and control means are provided with a memory with a number of pre-programmed control programs for the feed signal which can be activated on the basis of a control signal, an associated control program can be chosen when a specific appliance is recognized. A control program can also be self-learning such that variable preconditions are included in the program Examples hereof are domestic appliances of the same type with limited power differences (heating coils with a 10% distribution in wattage) and a domestic appliance of which the (electrical) properties change during use (due to wear or fouling). The preprogrammed programs can either form a good average for feeding a particular type of appliance or be the starting point for further (optionally self-learning) modifications of individual appliances. A modified control program can, at least when individual appliances are identifiable by the power supply, also be stored in a memory present for this purpose so that the modified program can be utilized when the associated appliance is once again coupled to the power supply.

In yet another preferred embodiment the power supply also comprises operating means connected to the measuring and control means for feeding a control signal independently of a domestic appliance. Such operating means can for instance be formed by communication means for actuating the operating means remotely and/or an operating panel integrated with the power supply. By means of for instance keys which form part of the power supply a determined power supply characteristic can be selected (for instance turbo, normal or economy). It is also possible instead to incorporate communication means in the power supply in the form of for instance a modem, an infrared interface, WAP-interface or otherwise controllable interface. By means of for instance an external computer or telephone it then becomes possible to influence the power supply of a domestic appliance. For manual operation the power supply can comprise an on/off-switch placed between the connection to the mains electricity supply and the connector. When it is desired that process information be outputted (for instance duration until end of processing, elapsed processing time, temperature of appliance etc.), the power supply can comprise display means for this purpose.

The invention also provides a domestic appliance for co-action with a power supply as described above, comprising an electrically driven element, such as for instance a heating element, cooling element or motor, and a mating connector for co-action with the connector of the power supply, characterized in that the mating connector and the electrically driven element are directly connected to each other. The domestic appliance can for instance consist of a kettle, cooking plate, sandwich toaster, egg cooker, bottle warmer, deep-fryer, fondue pan, raclette base, wok, pan, coffee-maker, tea-maker, air humidifier, bread oven, lemon squeezer, fan, shaker, mixer, lamp, cooling element, ice-maker and so on. The heating element, the cooling element or the motor of such a domestic appliance can connect directly to the mating connector via a connecting cable. Since except for the electrical element which directly provides the desired functionality, no other active components need be incorporated in the domestic appliance, it has an extremely simple construction. An example is the construction of a kettle according to the prior art. Such a kettle is provided with a steam detector at the top close to the lid. For proper operation of the steam detector the kettle must have a collecting space for steam close to the lid. The maximum filling level of an existing kettle therefore lies a considerable distance from the level of the lid. According to the present invention however, the active electrical components are accommodated in the power supply so that the empty space under the lid of a kettle becomes unnecessary. A domestic appliance according to the invention in the form of a kettle can for instance be provided for this purpose with a member which generates a leakage current when a determined temperature is reached and which is connected to an earth pin in the mating connector. As an alternative to detecting a determined temperature, an NTC or PTC thermistor can be arranged in the domestic appliance. The state of such a kettle or other domestic appliance, in which at least one temperature level must be detected, can thus be determined by means of detecting a leakage current or a signal coming from a thermistor. It is thus also possible that a measured leakage current or a signal coming from the thermistor (detecting that a determined temperature level has been exceeded) in combination with the power fed for this purpose (and detected by the power supply) produces further information as to the state of the domestic appliance. In the case of the kettle for instance a filling level of the kettle can thus be determined, on the basis of which further predictions are made concerning the further progression of the boiling process. A further boiling progression can for instance be chosen as desired wherein the increase in temperature close to the boiling point takes place more slowly than during a previous part of the heating process (bringing to the boil slowly) and/or it is possible, after the boiling point has been reached, to opt for stabilizing of the temperature of the liquid at this temperature level for a determined period (continued boiling). The leakage current-generating member can be embodied as a passive component in the kettle, for instance when it is formed by a glass-ceramic layer such as for instance an enamel layer.

BRIEF DESCRIPTION OF THE DRAWINGS

The invention will be further elucidated on the basis of the non-limitative embodiments shown in the following figures. Herein.

DETAILED DESCRIPTION OF THE PREFERRED EMBODIMENTS

Figure 1:
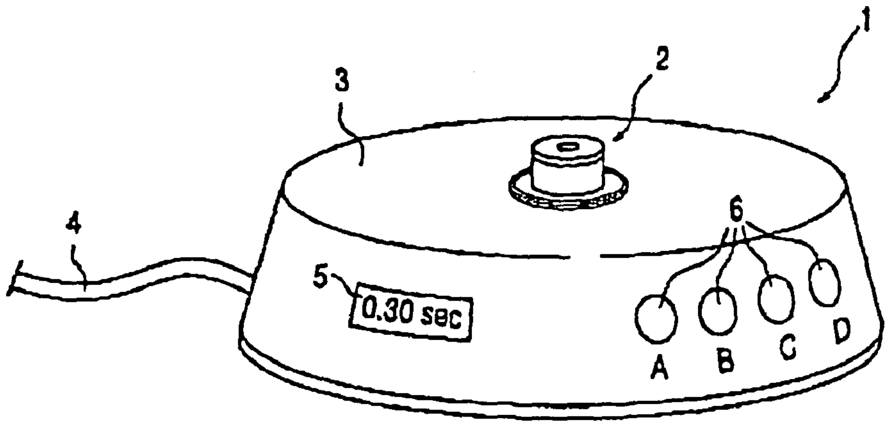
FIG. 1 shows a perspective view of a power supply according to the invention.

FIG. 1 shows a power supply 1 with a central connector 2 whereby an electrical connection to a random domestic appliance can be made. Power supply 1 has a separate housing 3 which is connected by means of a feed cable 4 to an electrical power source (not shown), for instance in the form of a mains electricity supply. Incorporated in housing 3 is a display screen 5 for output of data, and a number of keys 6 with which external choices can be made in respect of the desired power supply pattern. The connector 2 shown in this figure and located centrally on housing 3 can of course also take another form and/or be arranged at a different location on or in housing 3.

Figure 2:
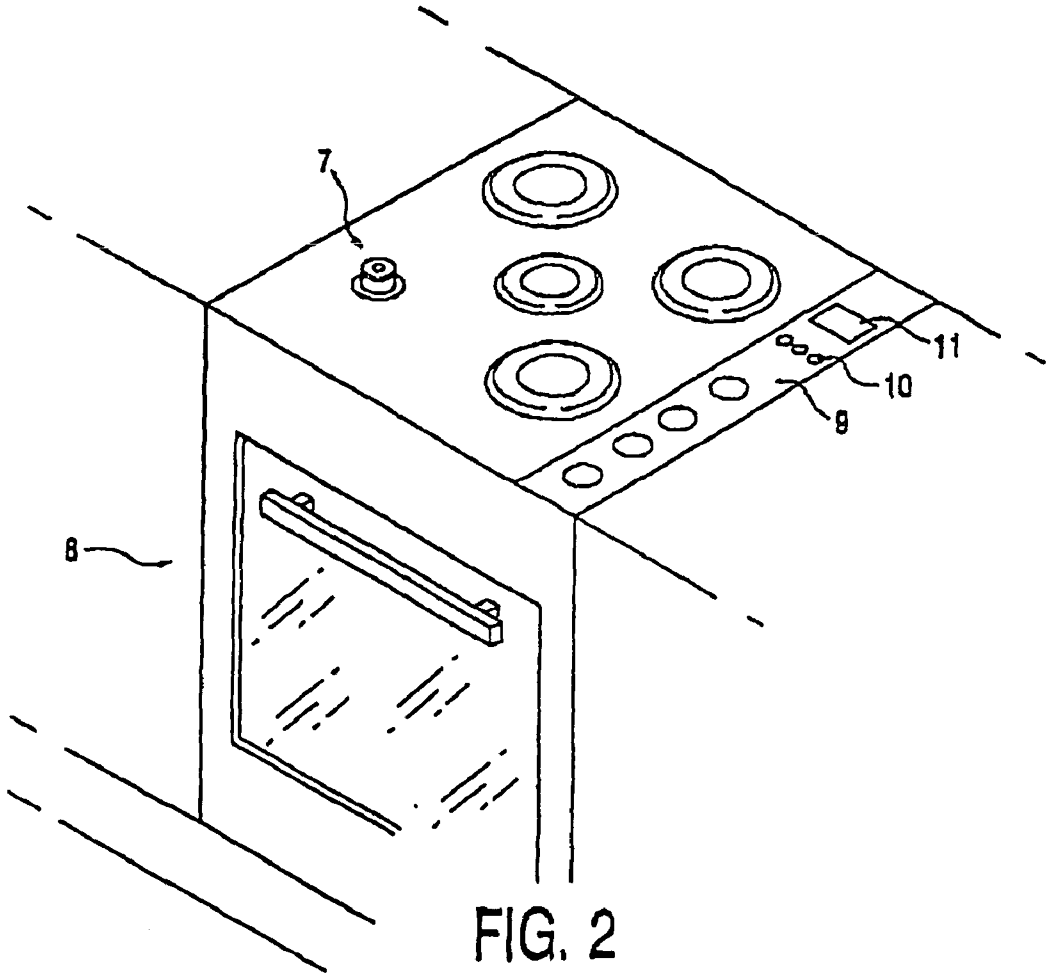
FIG. 2 shows a perspective view of a power supply according to the invention integrated into a cooker.

FIG. 2 shows a connector 7 of a power supply according to the invention (not further shown) which is integrated into a cooker 8 such that electrical domestic appliances can also be used on cooker 8. In addition to the power supply being practically wholly incorporated in cooker 8, this has the advantage that the domestic appliances can be used under an extractor hood system generally arranged above cooker 8. For manual operation of the power supply arranged in cooker 8 use can for instance be made of a control panel 9 which forms part of cooker 8 and on which several buttons 10 and a display 11 can be arranged which form part of the power supply.

Figure 3A:
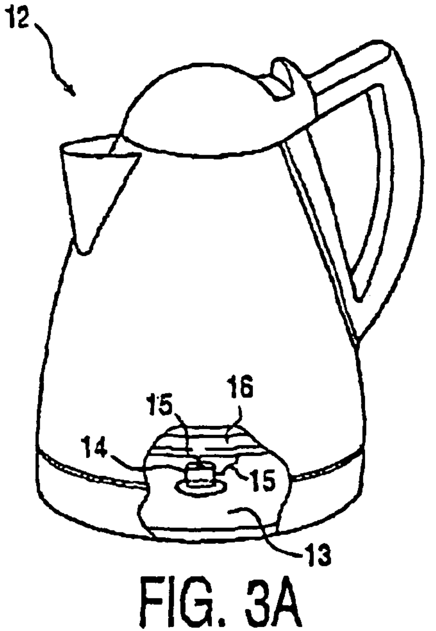
FIG. 3*a* is a perspective view of a kettle according to the invention for co-action with a power supply as shown in FIGS. 1 and 2.

FIG. 3*a* shows a partly cut-away kettle 12 which can take a smaller form than existing kettles while still retaining the usual capacity. In the base 13 of kettle 12 is arranged a mating connector 14 for co-action with connectors 2, 7 as shown in FIGS. 1 and 2. On the inside of kettle 12 the mating connector 24 is connected to an electric heating element 16 by means of wires 15, which can alternatively be embodied as spring contacts. Other electronics need not be present in kettle 12 for good operation. By means of the above described leakage current detection a measuring point can for instance be determined during the heating process.

Figure 3B:
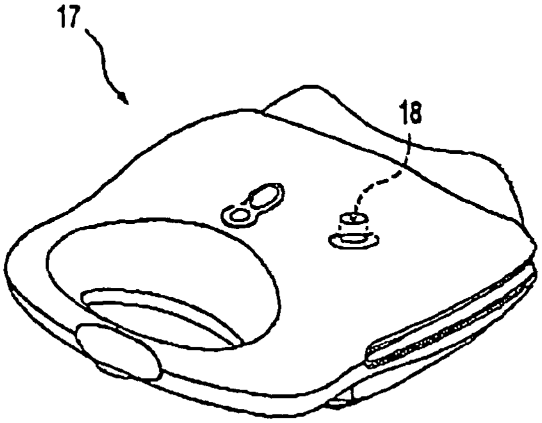
FIG. 3*b* is a perspective view of a sandwich toasted according to the invention for co-action with a power supply as shown in FIGS. 1 and 2.
Figure 3C:
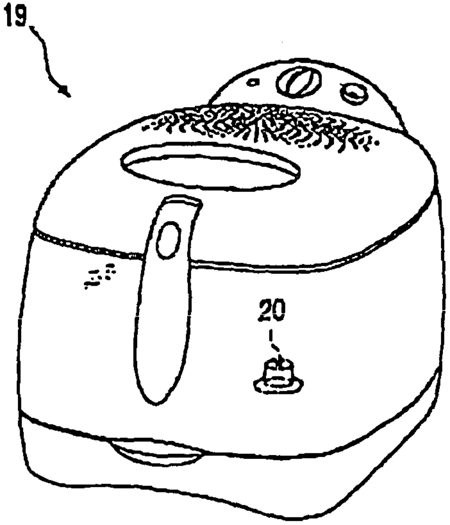
FIG. 3*c* shows a perspective view of a deep-fryer according to the invention for co-action with a power supply as shown in FIGS. 1 and 2.
Figure 3D:
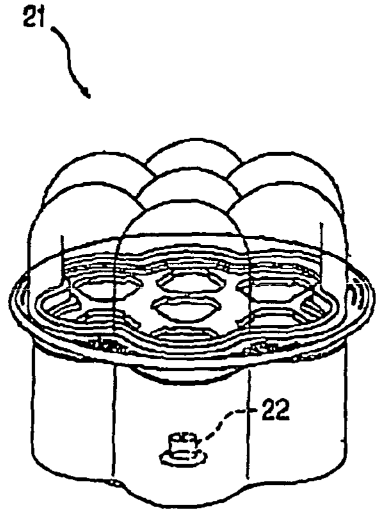
FIG. 3*d* shows a perspective view of an egg cooker according to the invention for co-action with a power supply as shown in FIGS. 1 and 2.
Figure 4:
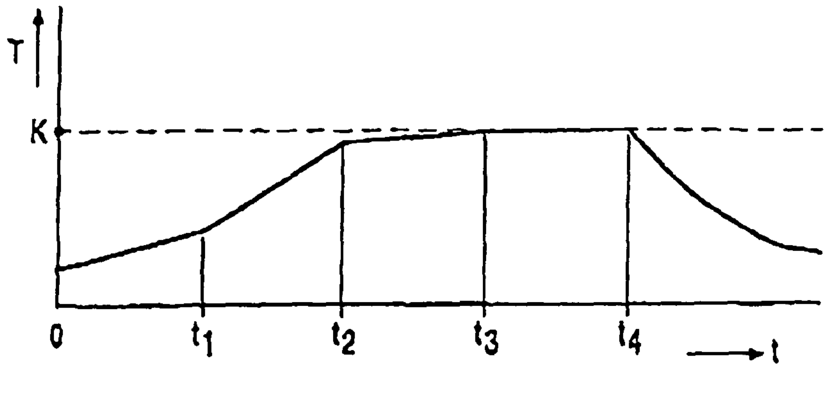
FIG. 4 is a graphic representation of a heating characteristic which can be realized using a power supply and domestic appliance according to the invention.

FIG. 3*b* shows a sandwich toaster 17 according to the invention which is provided on the underside with a mating connector 18 shown in broken lines. Sandwich toaster 17 can also be embodied without measuring and control means since these are already provided in a standard power supply with which the sandwich toaster can co-act. FIG. 3*c* shows a deep-fryer 19 with a schematically shown mating connector 20 situated on the underside, while FIG. 3*d* shows an egg cooker 21 with a schematically shown mating connector 22 situated on the underside. All the appliances 12, 17, 19 and 21, as well as many others, can be fed by a single power supply according to the invention FIG. 4 finally shows a heating characteristic of for instance a kettle which can be realized using the power supply according to the invention. The time t is plotted on the x-axis against the temperature T on the y-axis. From a time 0 a liquid is heated uniformly during a first period so as to thus limit the noise the kettle makes (the first part of the heating period is usually noisy when water is brought to boiling point at constant speed because there is not yet any circulation of liquid in the kettle). At a time t1 a determined leakage current coming from the kettle is for instance detected by the power supply. Since it is now apparent that the liquid has a minimum temperature, it is heated at a higher speed during a second heating period (from t1 to t2). The time t2 can be determined by the power supply on the basis of time t1 being known, but it is also possible to detect a second transition in the leakage current for this purpose. When the liquid has almost reached boiling temperature K, the liquid is brought slowly lo boiling point during a third heating period (from t2 to t3). After a stabilizing of the temperature during a fourth heating period (from t3 to t4), the liquid continues to boil and finally cools in unforced manner after time t4 (the kettle is switched off at t4). This example involves only a very simple heating period, but it will be evident that much more complex actuation of a heating element, cooling element or an electric motor are also possible.

Although the invention is elucidated with reference to only a few embodiments, it will be apparent to all that the invention is by no means limited to the described and shown embodiments. On the contrary, many variations are still possible for the skilled person within the scope of the invention.

The invention claimed is:

1. A power supply for electrical domestic appliances, comprising:

at least one connection to a mains electricity supply;

at least one connector for releasable electrical coupling of the power supply to a separate domestic appliance having an electrically driven element; and measuring and control means for controlling a feed signal generated by the power supply by means of at least one control signal transmitted by the domestic appliance, when the domestic appliance is coupled to the power supply, thereby controlling current and voltage supplied to the electrically driven element of the domestic appliance, wherein the domestic appliance has a sensor means for generating one of the at least one control signal, the at least one control signal that is detectable by the measuring and control means consists of the power taken up by the domestic appliance, and the domestic appliance and electrically driven element are separable from both the measuring and control means and the power supply, and wherein the power supply is provided with identification means for identifying a type of the domestic appliance coupled to the power supply.

2. The power supply as claimed in claim 1, wherein the connector comprises an earth wire which is connected to the measuring and control means, and that the at least one control signal detectable by the measuring and control means consists of a signal transmitted by the earth wire from a domestic appliance to the power supply.

3. The power supply as claimed in claim 1, wherein the measuring and control means are provided with a memory with a number of pre-programmed control programs for the feed signal which can be activated on the basis of the at least one control signal.

4. The power supply as claimed in claim 1, wherein the power supply also comprises operating means connected to the measuring and control means for feeding the at least one control signal independently of a domestic appliance.

5. The power supply as claimed in claim 4, wherein the operating means are provided with communication means for actuating the operating means remotely.

6. The power supply as claimed in claim 4, wherein the operating means comprise an operating panel integrated with the power supply.

7. The power supply as claimed in claim 1, wherein the power supply also comprises an on/off-switch placed between the connection to the mains electricity supply and the connector.

8. The power supply as claimed in claim 1, wherein the power supply also comprises display means.

9. A domestic appliance for co-action with a power supply, comprising:

an electrically driven element; and a mating connector for releasable electrical coupling of the domestic appliance to at least one connector of the power supply, the mating connector and the electrically driven element are directly connected to each other, and wherein the power supply comprises:

measuring and control means for controlling a feed signal generated by the power supply by means of at least one control signal, consisting of power taken up by the domestic appliance, transmitted by the domestic appliance thereby controlling current and voltage supplied to the electrically driven element of the domestic appliance, and further wherein the domestic appliance has a sensor means for generating at least one control signal, the domestic appliance is provided with a member which generates a leakage current when a determined temperature is reached and which is connected to an earth pin in the mating connector, and the domestic appliance and the electrically driven element are completely separable from the power supply and the measuring and control means thereof, and the power supply is provided with identification means for identifying a type the domestic appliance coupled to the power supply.

10. The domestic appliance as claimed in claim 9, wherein the leakage current-generating member is formed by a glass-ceramic layer.

11. The power supply as claimed in claim 1, wherein the sensor means is a member which generates a leakage current when a determined temperature is reached and which is connected to an earth pin in the mating connector.

12. The power supply as claimed in claim 1, wherein the sensor means is a thermistor arranged in the domestic appliance.

13. The power supply of claim 1, wherein the domestic appliance is a kettle, cooking plate, sandwich toaster, egg cooker, bottle warmer, deep-fryer, fondue pan, wok, pan, coffee-maker, tea-maker, bread oven, lemon squeezer, shaker, mixer, ice-maker or any combination thereof.

14. The domestic appliance of claim 9, wherein the domestic appliance is a kettle, cooking plate, sandwich toaster, egg cooker, bottle warmer, deep-fryer, fondue pan, wok, pan, coffee-maker, tea-maker, bread oven, lemon squeezer, shaker, mixer, ice-maker or any combination thereof.

* * * * *